United States Patent
Jayasena et al.

(10) Patent No.: US 10,382,410 B2
(45) Date of Patent: Aug. 13, 2019

(54) MEMORY OPERATION ENCRYPTION

(71) Applicant: Advanced Micro Devices Inc., Sunnyvale, CA (US)

(72) Inventors: Nuwan Jayasena, Sunnyvale, CA (US); Dong Ping Zhang, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 416 days.

(21) Appl. No.: 14/993,455

(22) Filed: Jan. 12, 2016

(65) Prior Publication Data
US 2017/0201503 A1    Jul. 13, 2017

(51) Int. Cl.
*H04L 29/06* (2006.01)
*G06F 12/14* (2006.01)
*H04L 9/32* (2006.01)

(52) U.S. Cl.
CPC ...... *H04L 63/0457* (2013.01); *G06F 12/1408* (2013.01); *H04L 9/3236* (2013.01); *H04L 63/061* (2013.01); *H04L 63/0876* (2013.01); *G06F 2212/1052* (2013.01)

(58) Field of Classification Search
CPC ............... H04L 63/0457; H04L 63/061; H04L 63/0876; H04L 29/06; H04L 9/3236; G06F 12/1408; G06F 2212/1052; G06F 12/14
USPC ............ 713/162, 165, 166; 726/26; 380/264
See application file for complete search history.

(56) References Cited

U.S. PATENT DOCUMENTS

| | | | |
|---|---|---|---|
| 7,184,549 B2* | 2/2007 | Sorimachi | H04L 9/0637 380/28 |
| 2004/0247128 A1 | 12/2004 | Patariu et al. | |
| 2007/0192631 A1 | 8/2007 | Anderson | |
| 2007/0247128 A1 | 8/2007 | Anderson | |
| 2008/0244217 A1* | 10/2008 | Baum | G06F 21/51 711/173 |

(Continued)

FOREIGN PATENT DOCUMENTS

WO   2008019189 A2   2/2008

OTHER PUBLICATIONS

International Search Report and Written Opinion issued in Application No. PCT/US2016/052839 dated Dec. 27, 2016, 13 pages.

(Continued)

*Primary Examiner* — Ashokkumar B Patel
*Assistant Examiner* — Quazi Farooqui

(57) ABSTRACT

A processing system includes a processing module having a first interface coupleable to an interconnect. The first interface includes a first cryptologic engine to encrypt a representation of store data of a store operation and a memory address using a first key and a first feedback-based cryptologic process to generate first encrypted data and an encrypted memory address. A memory module includes a second interface coupled to the interconnect. The second interface includes a second cryptologic engine to decrypt the first encrypted data and the encrypted memory address using a second key and a second feedback-based cryptologic process to generate a copy of the representation of the store data and a copy of the memory address. The second interface further is to store the copy of the representation of the store data to a memory location of the memory core based on the copy of the memory address.

20 Claims, 4 Drawing Sheets

(56) References Cited

U.S. PATENT DOCUMENTS

| | | | |
|---|---|---|---|
| 2011/0145016 A1* | 6/2011 | Eshraghian | G06Q 50/24 |
| | | | 705/3 |
| 2012/0262272 A1* | 10/2012 | Donlan | G07C 5/008 |
| | | | 340/5.61 |
| 2013/0145177 A1 | 6/2013 | Cordella et al. | |
| 2014/0205099 A1* | 7/2014 | Christodorescu | H04L 9/0819 |
| | | | 380/278 |
| 2015/0019878 A1 | 1/2015 | Gammel | |
| 2017/0142129 A1* | 5/2017 | Peng | H04L 47/72 |

OTHER PUBLICATIONS

Elbaz, Reouven, et al., "Hardware Mechanisms for Memory Authentication: A Survey of Existing Techniques and Engines," Transactions on Computational Science IV, pp. 1-22, 2009.

International Preliminary Report on Patentability dated Jul. 17, 2018 in Application No. PCT/US2016/052839, 10 pages.

* cited by examiner

MEMORY OPERATION ENCRYPTION

BACKGROUND

Field of the Disclosure

The present disclosure relates generally to processing systems utilizing memory for data storage and, more particularly, to processing systems utilizing encrypted memory.

Description of the Related Art

The use of encrypted memory (that is, where the contents of memory are encrypted) has been proposed as a way to enhance security in settings where the data owner does not have physical control over the hardware used for execution. However, conventional approaches to encrypted memory are vulnerable to rudimentary attack techniques due to the need to individually and separately encrypt cache lines in view of the unpredictability of memory accesses, and the constraints of the typical processor-memory architecture.

Conventional encrypted memory implementations typically rely on electronic codebook (ECB)-based encryption schemes in which the data to be stored in the memory is encrypted solely as a function of the data and the encryption key to be used. This approach has a number of weaknesses, such as the fact that any two cache lines that have the same plaintext result in the same ciphertext, which can leak information about the data to an observer of the encrypted data. Such information makes ECB prone to "dictionary" attacks in which statistical properties of the data may be used to infer information about the encrypted data and possibly to even decipher the encryption key used to encrypt the data. Another weakness of conventional ECB-based encrypted memory implementations is that they are prone to data "injection" attacks in which an attacker injects traffic onto the interconnect between the processor and the memory that can corrupt or overwrite the encrypted data. To thwart such attacks, conventional encrypted memory systems often rely on the generation of tree-based structures over the entire contents of the memory, and thus requiring many memory accesses to authenticate each load operation or store operation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
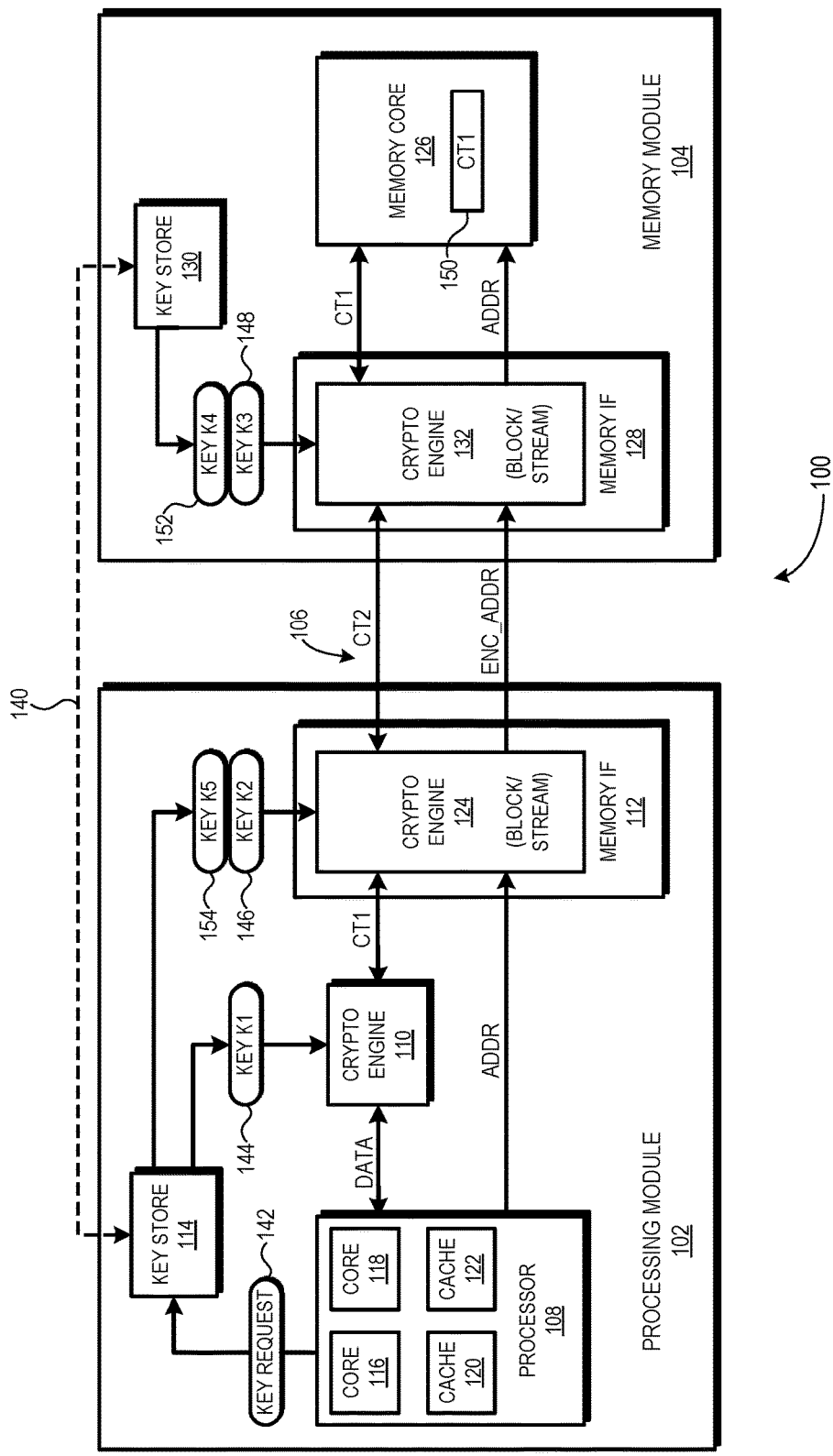
FIG. 1 is a block diagram of a processing system employing an encrypted memory in accordance with some embodiments.

FIGS. 1-5 illustrate example methods and systems for employing an enhanced encrypted memory in a processing system. In at least one embodiment, a processing system includes a processing module coupled to a memory module via a memory bus or other interconnect. For a store-type memory access operation (that is, a "store operation"), the processing module encrypts the cache line or other data to be stored using a first key to generate a first ciphertext. A cryptologic engine of the processing module then encrypts the first ciphertext using a second key to generate a second ciphertext. The cryptologic engine also encrypts the memory address associated with the store operation using the second key or another key to generate an encrypted memory address. The second encrypted data and the encrypted memory address are transmitted to the memory module via the interconnect. The memory module decrypts the encrypted memory address and the second encrypted ciphertext to obtain copies of the memory address and first encrypted ciphertext, respectively. The memory module then stores the copy of the first encrypted ciphertext at a memory location addressed by the copy of the memory address.

For a load-type memory access operation (that is, a "load operation"), the processing module encrypts the memory address associated with the load operation using the second key or another key to generate an encrypted memory address and transmits this encrypted memory address to the memory module via the interconnect. The memory module decrypts the encrypted memory address to obtain a copy of the memory address and accesses first ciphertext stored at a memory location addressed by the copy of the memory address. The memory module then further encrypts the first ciphertext to generate second ciphertext, which is transmitted to the processing module via the interface. At the processing module, the second ciphertext is decrypted to generate a copy of the first ciphertext, and the copy of the first ciphertext is decrypted to generate a copy of the load data sought by the load operation.

In at least one embodiment, the connection between each memory module and each processing module is served by separate, dedicated instances of the interconnect and corresponding cryptologic engines at both sides of the interconnect. This configuration results in a situation whereby the cryptologic engine at the memory module observes the same sequence of data accesses as the cryptologic engine at the processing module. Accordingly, in contrast to conventional encrypted memory implementations, the cryptologic engines may utilize cryptologic processes that are not only functions of the current cache line or other datum being encrypted, but also functions of one or more previous cache lines or other data that were previously encrypted. This type of cryptologic process is referred to herein as a "feedback-based cryptologic process". Examples of feedback-dependent cryptologic processes include block-chaining cryptologic processes, such as cipher block chaining (CBC) and cipher feedback (CFB) algorithms, as well as stream ciphers, such as the CryptMT and Rabbit algorithms. Feedback-based cryptologic processes typically provide enhanced cryptologic security compared to cryptologic processes that are a function of only the current cache line/datum being encrypted, and thus the ability to employ feedback-based cryptologic processes provides improved resistance against unauthorized attempts to access the plaintext data, such as through the use dictionary-type attacks or analysis of the memory access pattern by an unauthorized observer.

FIG. 1 illustrates a processing system 100 employing secure data storage in accordance with at least one embodiment of the present disclosure. The processing system 100 may represent, for example, a system in which the owner of the data stored therein does not have physical control of the hardware that stores and processes the data, such as in a "cloud" server scenario. In the depicted example, the processing system 100 includes at least one processing module 102 coupled to a memory module 104 via an interconnect 106.

The processing module 102 comprises one or more processors 108, a hardware cryptologic engine 110, a memory interface 112, and further may include a key store 114. The processor 108 may comprise, for example, a central processing unit (CPU), graphics processing unit (GPU), or combination thereof, and may include one or more processor cores, such as processor cores 116, 118, and one or more caches, such as caches 120, 122. The memory interface 112 is coupled to the processor 108, the cryptologic engine 110, the key store 114 and the interconnect 106, and includes a cryptologic engine 124.

The memory module 104 operates as an encrypted memory for the processing module 102. To this end, the memory module 104 includes a memory core 126, a memory interface 128, and may include a key store 130. The memory core 126 comprises a plurality of memory locations (not shown), or entries, each accessed via a corresponding memory address (e.g., a physical memory address). The memory core 126 may be implemented using any of a variety of random access memory (RAM) architectures, such as a static RAM (SRAM) architecture, a dynamic RAM (DRAM) architecture, a non-volatile RAM (NVRAM) architecture, a Flash memory architecture, and the like. The memory interface 128 is coupled to the memory core 126, the key store 130, and the interconnect 106, and includes a cryptologic engine 132.

The interconnect 106 comprises a bus or other type of interconnect serving as a bi-directional interface between the processing module 102 and the memory module 104. The interconnect 106 comprises a plurality of signal paths to conduct signaling for memory access operations performed between the modules 102, 104, including signal paths for transmitting memory address information, signal paths for transmitting data information, signal paths for transmitting control information, and the like. In implementations with multiple processing modules 102 connected to the same memory module 104, in one embodiment each processing module 102 has a separate, dedicated interconnect 106 with the memory module 104, and the memory module 104 would then implement a separate memory interface 128 for each processing module 102/interconnect 106. Similarly, in some implementations a processing module 102 may be connected to multiple memory modules 104, in which case the processing module 102 would implement a separate memory interface 112 for each interconnect 106 connecting the processing module 102 to a corresponding memory module 104. Under this arrangement, the interfaces 112, 128 at the opposite sides of an interconnect 106 connecting a particular pairing of processing module 102 and memory module 104 both observe the same sequence of load operations and store operations, and thus may implement feedback-based cryptologic processes As described in greater detail below with reference to FIG. 5, in a typical implementation the processing module 102 and the memory module 104 would be implemented as separate devices or packages, and the interconnect 106 would thus be implemented as a set of conductive traces traversing an interposer or circuit board on which both modules 102, 104 are implemented or traversing a cable connecting the two modules 102, 104. As such, the interconnect 106 may be particularly susceptible to unauthorized access in the form of physical taps connected to the conductive traces. Such physical taps then may be used by an unauthorized party to attempt to gain access to the plaintext version of data stored in the memory module 104 or otherwise transmitted between the modules 102, 104, such as via a dictionary-type attack.

In view of the vulnerability of the interconnect 106, the processing system 100 employs a combination of cryptological techniques to enhance data security. As described in greater detail below with reference to FIG. 2, the modules 102, 104 employ feedback-based cryptologic processes for the data transmitted over the interconnect 106 (and stored in the memory core 126) so as to frustrate attempts to access the data in plaintext form through the use of dictionary-style attacks or other attempts at analyzing the statistical properties of data streams over the interconnect. Further, to prevent leakage of information about memory access patterns, the modules 102, 104 employ an encryption scheme for the memory addresses transmitted over the interconnect 106. Moreover, as described in greater detail below with reference to FIGS. 3 and 4, the processing system 100 may utilize one or both of a cryptologic hash-based authentication process or a serial number-based authentication process to further enhance data security in the processing system 100.

Figure 2:
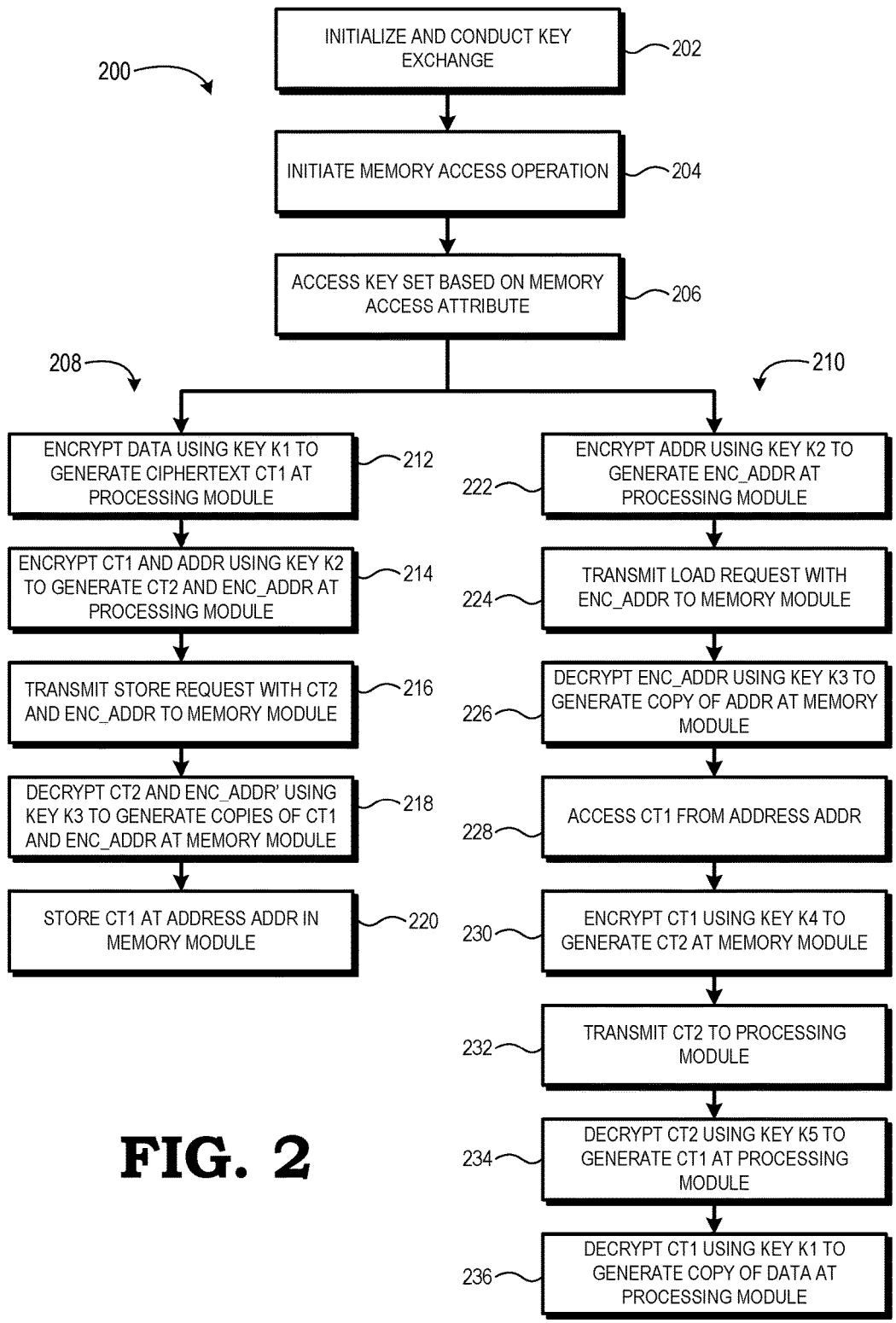
FIG. 2 is a flow diagram illustrating a method for performing a secure memory access operation in the processing system of FIG. 1 in accordance with some embodiments.

FIG. 2 illustrates a method 200 of operation of the processing system 100 for performing a secure memory access operation in accordance with at least one embodiment of the present disclosure. A memory access operation generally may be broadly categorized as either a store-type memory access operation ("store operation") or a load-type memory access operation ("load operation"). For a store operation, data is provided by the processing module 102 for storage at a corresponding location in the memory core 126 of the memory module 104. Inversely, for a load operation, data is accessed from a corresponding location of the memory core 126 and transmitted to the processing module 102, whereupon the load data is stored in one or more caches or registers of the processor 108 for subsequent use. Typically, the data stored or loaded is done in the form or size of a cache line and thus reference is made herein to the storage and access of data on the example basis of cache lines, but in some embodiments the data may be sized smaller than, or larger than, a cache line.

Following a power-on-reset (POR) or other initialization/re-initialization event, and prior to processing of memory access operations, at block 202 the processing system 100 conducts an initialization process, which typically includes a key exchange 140 (FIG. 1) or other key initialization between the memory interface 112 of the processing module 102 and the memory interface 128 of the memory module 104. In some embodiments, the processing system 100 employs a public-private key scheme. For this scheme, the memory interface 112 of the processing module 102 queries the memory interface 128 for the public key of the memory interface 128, such as by reading the public key from a pre-identified memory location, and then encrypts the keys(s) to be shared using the public key at the cryptologic engine 124 and transmits the encrypted key(s) to the memory interface 128 of the memory module 104. The encrypted key(s) are decrypted by using the corresponding private key of the memory interface 128, and the resulting decrypted key(s) are then stored in the key store 130 of the memory module 104.

Alternatively, the memory module 104 may generate the key(s) to be used by the memory interfaces 112, 128 and communicate the key(s) to be used by the memory interface 112 to the processing module 102, whereupon the key(s) are stored in the key store 114 of the processing module 102.

This may be accomplished by, for example, the memory interface 128 generating the key(s) (for example, in response to a command from the processing module 102), encrypting the key(s) using a public key provided by the processing module 102, and then storing the encrypted key(s) in a known location in the memory core 126, whereupon the processing module 102 may access them, decrypt them using a corresponding private key, and storing the decrypted key(s) in the key store 130.

Some uses of the processing system 100 may result in multiple data owners making use of the processing module 102 and the memory module 104 concurrently. Accordingly, to further ensure the security of the data, in such implementations, multiple key sets may be implemented. To illustrate, different key sets may be implemented on a per-physical-requestor (e.g., per-core) basis, a per-thread basis, a per-process basis, a per-address-space basis, and the like. In such instances, the different key sets are indexed within the key stores 114, 130 based on a requestor identifier (ID) or other memory access attribute, such as a core ID, thread ID, process ID, or address space ID, that is then referenced when the memory access operation is initiated so as to access the appropriate key set, as discussed below.

With the memory interfaces 112, 128 and key stores 114, 130 initiated with the appropriate key(s), the processing system 100 is ready to perform memory access operations. Accordingly, at block 204 a requestor at the processing module 102 initiates a memory access operation, which, as noted above, generally takes the form of either a store operation to store data to the memory module 104 or a load operation to access data from the memory module 104. In the event that multiple key sets are in use, at block 206 the memory interfaces 112, 128 access the appropriate key set from the key stores 114, 130 respectively. To illustrate, when a memory access operation is initiated at block 204, or when a requestor takes over control of the resources of the processing module 102 from a previous requestor, at block 206 the processor 108 may issue a key request 142 (FIG. 1) to the key store 114, where the key request 142 may include a representation of the pertinent memory access attribute, such as the ID of the core, thread, process requesting the memory access operation or the ID of the address space pertaining to the memory access operation. Further, the memory interface 112 provides this same information to the memory interface 128 so that the appropriate key set may be accessed from the key store 130 of the memory module 104.

In some embodiments, the memory interface 112 provides the memory access attribute information or some other representative index to the memory interface 132 as a separate communication (which may be encrypted via pre-identified public-private keys) over the interconnect 106 or via a separate side band connection prior to the transmission of the corresponding memory access request. In another embodiment, the memory interface 112 may include the memory access attribute or other representative index as part of the signaling provided for the memory access request (e.g., within control signaling). The corresponding keys (described below) are accessed from the respective key stores 114, 130 and temporarily stored in a corresponding buffer or register of the cryptologic engines 110, 124, 132.

With the cryptologic engines 110, 124, 132 initialized, the processing system 100 is ready to begin the memory access operation, which may comprise a store operation or a load operation. Flow path 208 of FIG. 2 illustrates the process as performed for store operations and flow path 210 of FIG. 2 illustrates the process as performed for load operations.

A store operation is initiated at block 212 of flow path 208, whereupon the plaintext store data (denoted "DATA" in FIG. 1) to be stored at a corresponding addressed location of the memory core 126 (e.g., a cache line evicted from one of the caches 120, 122) is provided to the cryptologic engine 110, whereupon the cryptologic engine 110 encrypts the plaintext data using a key K1 (key 144, FIG. 1), known only to the processing module 102, to generate a first encrypted data, or ciphertext, (denoted herein as ciphertext "CT1"). Any of a variety of encryption algorithms may be used to encrypt the plaintext data, such as AES (Advanced Encryption Standard), DES (Data Encryption Standard), 3DES (Triple DES), PGP (Pretty Good Privacy), Blowfish, and the like. The first ciphertext CT1 and the memory address (denoted "ADDR") to which the data is to be stored are then provided to the memory interface 112, where at block 214 the cryptologic engine 124 encrypts the first ciphertext CT1 and the memory address ADDR using a different key K2 (key 146, FIG. 1) in accordance with a feedback-based cryptologic process (e.g., CFB or a stream cipher) to generate a second encrypted data (denoted as ciphertext "CT2") and an encrypted memory address (denoted as "EN_ADDR"), respectively. Although FIG. 1 illustrates an implementation whereby the data is twice-encrypted, before being transmitted across the interconnect 106, in some embodiments the first encryption by the cryptologic engine 110 is omitted, in which case the plaintext data DATA is provided to the cryptologic engine 110 in place of the ciphertext CT1 for encryption into ciphertext CT2.

In one embodiment, the first ciphertext CT1 and the memory address ADDR are encrypted separately (albeit in parallel) to generate separate encrypted values. However, in other embodiments, the first ciphertext CT1 and the memory address ADDR may be encrypted together to generate a single encrypted value, such as by concatenating the first ciphertext CT1 and memory address into a single value before encryption. At block 216, the memory interface 112 transmits a store request to the memory module 104 via signaling conducted over the interconnect 106, where the signaling includes the second ciphertext CT2 and the encrypted memory address EN_ADDR.

The memory interface 128 receives the signaling representative of the store request, and at block 218 the cryptologic engine 132 decrypts the second ciphertext CT2 and the encrypted memory address EN_ADDR using a key K3 (key 148, FIG. 1) to generate a copy of the first ciphertext CT1 and a plaintext copy of the memory address ADDR. The cryptologic engines 124, 132 may employ a symmetric-key encryption process (e.g., AES, DES), in which case the keys K2 and K3 are the same key. With the address decrypted, at block 220 the memory interface 128 stores the first ciphertext CT1 at a memory location 150 (FIG. 1) of the memory core 126 that is addressed by, or otherwise associated with, the memory address ADDR obtained at block 218.

Any of a variety of encryption algorithms may be employed to encrypt and decrypt the first ciphertext CT1 and the memory address ADDR, such as any of the encryption algorithms noted above. In particular, because each interconnect 106 is specific to a particular processing module/memory module pairing, the memory interfaces 112 of the processing module 102 and the memory interface 128 of the memory module 104 both see the same sequence of cache lines or other data. As such, the cryptologic engines 124, 132 each may employ feedback-based encryption techniques where recurrences of the same plaintext item do not result in the same ciphertext, such as stream ciphers or block-chaining ciphers during the encryption and decryption processes, respectively, as described in detail below with reference to FIG. 4.

As demonstrated by flow path 208, during a store operation the store data is encrypted via block chaining or stream cipher before being transmitted over the interconnect 106, which typically avoids the situation whereby encryption of a given plaintext value results in the same encrypted value each time. As such, the system 100 resists dictionary-style attacks through analysis of the data transmitted over the interconnect 106. Further, in embodiments wherein the cryptologic engine 110 is utilized, the data remains in encrypted form (as ciphertext CT1) when stored in memory core 126, thus frustrating attempts to gain access to the plaintext version of the data in the event that the memory core 126 is breached by an unauthorized entity. Moreover, the memory address ADDR for the store operation is encrypted before transmission, thereby preventing leakage of memory access patterns or other memory access information which may be used as the basis for an attack on the data of the processing system 100.

Returning to block 206, in the event that the memory access operation is a load operation, the memory address (denoted "ADDR") for the load operation is provided from the processor 108 to the memory interface 112, whereupon at block 222 the cryptologic engine 124 encrypts the memory address using a key K2 (key 146, FIG. 1) and a block-chaining or stream cipher algorithm to generate an encrypted memory address (denoted "EN_ADDR"). The key K2 used for load operations may be the same key K2 used for store operations, or may be a different key. At block 224, the memory interface 112 transmits a load request to the memory module 104 via signaling conducted over the interconnect 106, where the signaling includes the encrypted memory address EN_ADDR.

The memory interface 128 receives the signaling representative of the load request, and at block 226 the cryptologic engine 132 decrypts the encrypted memory address EN_ADDR using a key K3 (key 148, FIG. 1) and the corresponding block-chaining or stream cipher algorithm to generate a plaintext copy of the memory address ADDR. The key K3 used for load operations may be the same key K3 used for store operations, or may be a different key. At block 228, the memory interface 128 accesses the requested data from the memory location (e.g., location 150, FIG. 1) of the memory core 126 that is referenced by the obtained copy of the memory address ADDR. As explained above, during store operations the data is stored in the memory core 126 as encrypted data, or ciphertext, and thus the accessed data is referred to herein as first ciphertext CT1.

With the requested data obtained from the memory core 126, at block 230 the cryptologic engine 132 further encrypts the encrypted ciphertext CT1 using key K4 (key 152, FIG. 1) to generate second ciphertext CT2. In a symmetric-key encryption implementation, key K4 may be the same key as key K2 used by the cryptologic engine 124, or in a shared-key implementation, the key K4 may be the public key of a public key-private key pair. At block 232, the memory interface 128 transmits the second ciphertext CT2 to the processing module 102 using signaling representative of a load result or load reply to the memory interface 112 via the interconnect 106.

With receipt of the second ciphertext CT2 at the memory interface 112, at block 234 the cryptologic engine 124 decrypts the second ciphertext CT2 using key K5 (key 154, FIG. 5) to generate a copy of the first ciphertext CT1 that was stored in the memory core 126. Key K5 may be the same key as key K2, and may be the same key as key K4 in the event that symmetric-key encryption is employed by the cryptologic engines 124, 132. Alternatively, if a public key/private key scheme is employed, then key K5 would be the private key of the key pair, with key K4 being the public key, as noted above. At block 236, the cryptologic engine 110 decrypts the obtained copy of the first ciphertext CT1 using key K1 to obtain a copy of the plaintext load data represented by the first ciphertext CT1. This plaintext load data then may be stored at a cache line or other temporary storage location of a corresponding one of the cores 116, 118 for access by the requestor of the load operation.

As demonstrated by flow path 210, during a load operation the load data is encrypted using a feedback-based cryptologic process before being transmitted over the interconnect 106 from the memory module 104 to the processing module 102 and the memory address ADDR for the load operation is encrypted before transmission, both of which provide for enhanced data security, as similarly noted above with reference to flow path 208.

Because the interconnect 106 may be relatively easily accessed and physically tapped, an attacker may attempt to use the interconnect 106 to inject fake store operations so as to overwrite encrypted data stored at the memory module 104 and thus corrupt the data stored therein. Thus, to prevent such attacks, in at least one embodiment the processing system 100 may employ various authentication processes to verify that the store operation is in fact a valid store operation from an authorized requestor. Such authentication processes may include, for example, a cryptologic hash authentication process or a serial number-based authentication process.

Figure 3:
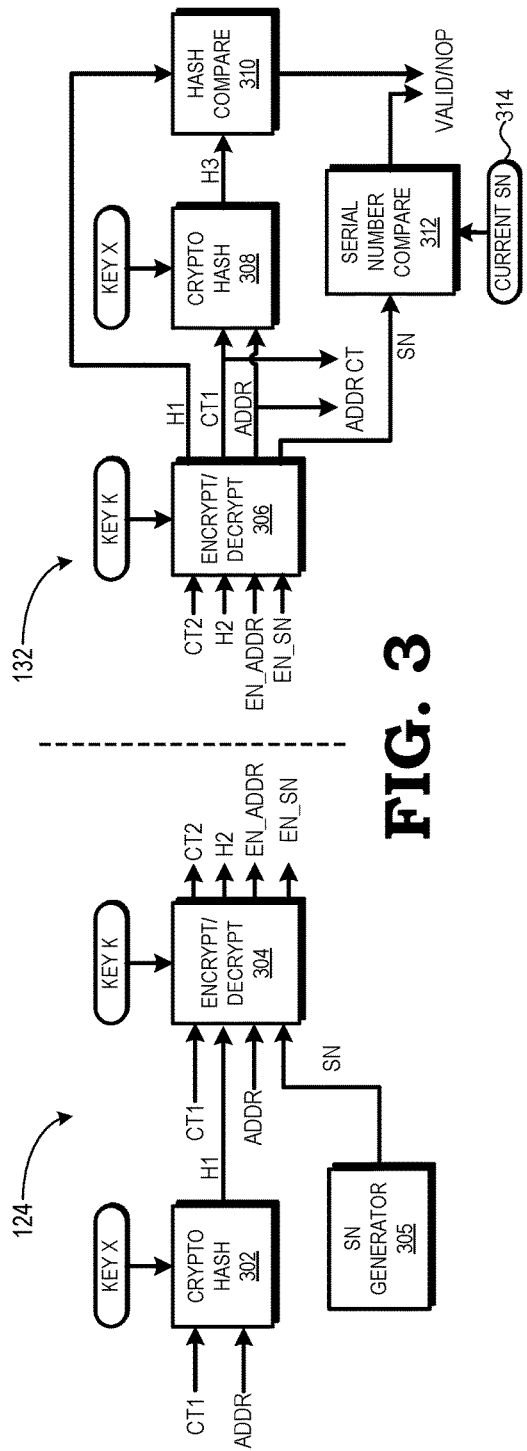
FIG. 3 is a block diagram illustrating an example implementation of paired memory interfaces utilizing one or both of a cryptologic hash and a serial number for authentication in accordance with some embodiments.

FIG. 3 illustrates an example hardware implementation for implementing either or both of these authentication processes in accordance with at least one embodiment. In the depicted embodiment, the cryptologic engine 124 of the memory interface 112 includes a cryptologic hash module 302, an encrypt/decrypt module 304, and a serial number generator 305. Similarly, the cryptologic engine 132 of the memory interface 128 includes an encrypt/decrypt module 306, a cryptologic hash module 308, hash compare logic 310, and serial number compare logic 312.

For a hash-based authentication operation, the first ciphertext CT1 and the memory address ADDR are input to the cryptologic hash module 302, which performs a cryptologic hash of the first ciphertext CT1 and memory address ADDR using a hash key X to generate a hash value (denoted "H1"). The hash value H1 is then input to the encrypt/decrypt module 304, whereupon the encrypt/decrypt module 304 encrypts the hash value H1, the first ciphertext CT1, and the memory address ADDR using a corresponding key K (e.g., key K2, FIG. 1) to generate an encrypted hash value (denoted "H2"), the second ciphertext CT2, and the encrypted memory address EN_ADDR, respectively. The encrypted hash value H2 then is transmitted along with the second ciphertext CT2 and the encrypted memory address EN_ADDR as part of the signaling for the store operation, as described above. With the receipt of this signaling at the memory interface 128, the encrypt/decrypt module 306 decrypts the encrypted hash value H2, the second cipher text CT2, and the encrypted memory address EN_ADDR using a corresponding key K (e.g., key K3, FIG. 1) to generate plaintext copies of the hash value H1 and the memory address ADDR and to generate a copy of the first ciphertext CT1.

To verify that the received store operation is legitimate, the cryptologic hash module 308 performs the same, or symmetric hash operation performed by the cryptologic hash module 302, using the obtained copies of the hash value H1, the memory address ADDR, and the first ciphertext CT1, resulting in a hash value (denoted "H3"). The hash compare logic 310 then compares the obtained copy of the hash value H1 with the generated hash value H3. In the event that the result of the comparison reveals that the two hash values match, the hash compare logic 310 identifies the store operation as authorized and therefore provides a "VALID" signal, in response to which the memory interface 128 continues processing the store operation. However, as an attacker is unlikely to have a copy of the key X used for the cryptologic hash modules 302, 308, an attacker's attempt to inject a fraudulent store operation will result in a mismatch between the obtained hash value H1 and the generated hash value H3. In such an event, the hash compare logic 310 provides a "NOP" signal, in response to which the memory interface 128 ceases any further processing of the store operation, and treats the store operation as a "no operation" or "NOP."

For a serial number-based authentication operation, the serial number generator 305 generates the next serial number in a sequence of serial numbers (e.g., either an incrementing or decrementing sequence) and provides this serial number as value SN to the encrypt/decrypt module 304, which encrypts the serial number SN, the first ciphertext CT1, and the memory ADDR using a corresponding key K (e.g., key K2, FIG. 1) to generate an encrypted serial number (denoted "EN_SN"), the second ciphertext CT2, and the encrypted memory address EN_ADDR, respectively. These values then are transmitted as part of the signaling for the store operation, as described above. With the receipt of this signaling at the memory interface 128, the encrypt/decrypt module 306 decrypts the encrypted serial number EN_SN, the second cipher text CT2, and the encrypted memory address EN_ADDR using a corresponding key K (e.g., key K3, FIG. 1) to generate plaintext copies of the serial number SN and the memory address ADDR and to generate a copy of the first ciphertext CT1.

To verify that the received store operation is legitimate, the serial number compare logic 312 maintains the current serial number in use from the sequence in a register 314 or other storage component. This may be achieved by incrementing or decrementing a local copy of the current serial number for each memory access operation attempted, or by storing the serial number of the last memory access operation to be authenticated in the register 314. The decrypted copy of the serial number SN is provided from the encrypt/decrypt module 306 to the serial number compare logic 312, which then compares this serial number SN with the current serial number. If the comparison indicates that the received serial number SN is correctly the expected next serial number in the sequence, then the serial number compare logic 312 identifies the store operation as authorized and therefore provides a "VALID" signal, in response to which the memory interface 128 continues processing the store operation. However, as an attacker is unlikely to know the next serial number in sequence, an attacker's attempt to inject a fraudulent store operation with a fabricated serial number will result in a mismatch between the decrypted copy of the serial number SN and expected next serial number in the sequence. In such an event, the serial number compare logic 312 provides a "NOP" signal, in response to which the memory interface 128 ceases any further processing of the store operation, and treats the store operation as a "no operation" or "NOP."

In some embodiments, both authentication processes may be utilized in parallel, in which case AND logic may be used to provide a "VALID" signal when both the hash compare logic 310 and the serial number compare logic 312 signal "VALID" and to provide a "NOP" signal when either of the hash compare logic 310 and the serial number compare logic 312 signals "NOP."

As each processing module/memory module pairing implements a separate implementation of the interconnect 106 and memory interfaces 112, 128, the memory interface 112 for a given processing module 102 observes the same sequence of memory access operations as the corresponding memory interface 128 on the other side of the interconnect 106, and vice versa. Thus, in contrast to conventional systems, the processing system 100 may employ a stream cipher or chaining mode of a block cipher as part of the encryption/decryption processes performed at the cryptologic engines 124, 132. In a typical chaining mode or stream cipher, the encryption (or decryption) of a cache line or other datum is a function of not just the current cache line/datum and an encryption key, but also of the cache lines/data of one or more previous load operations or store operations that were encrypted before the current cache line. However, the implementation of such feedback-dependent cryptologic processes into an encrypted memory system may introduce a second encryption process in the timing-critical memory access path, and thus runs the risk of increasing memory latency.

Figure 4:
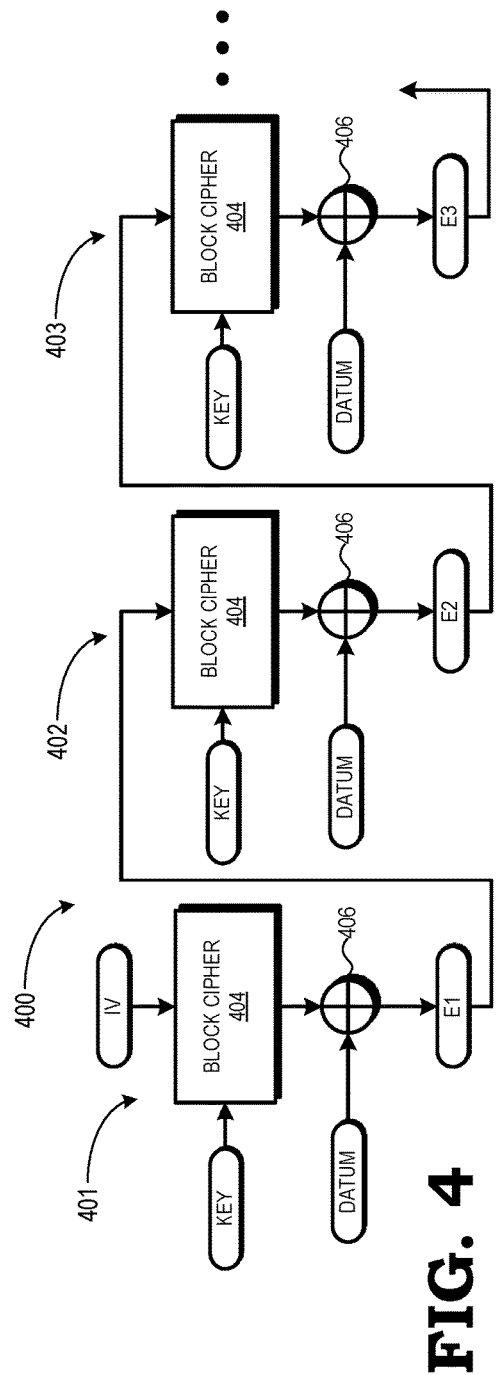
FIG. 4 is a block diagram illustrating a cryptologic engine based on block chaining in accordance with some embodiments.

FIG. 4 illustrates an example hardware implementation 400 for the cryptologic engines 124, 132 that employs a cipher feedback (CFB) mode that reduces the impact on memory access latency by generating the key material outside of the memory access critical path. In the depicted embodiment, the hardware implementation 400 represents the encryption path hardware that may be implemented by both of the cryptologic engines 124, 132. The decryption path hardware may be implemented in the same manner.

The hardware implementation 400 includes block cipher logic 404 and XOR logic 406, which are repeated logically for three sequential encryption stages, identified as stages 401, 402, 403. The block cipher logic 404 has two inputs: one input to receive a key (denoted "KEY" in FIG. 4) and an input to receive an encrypted output from the previous stage, with the exception that the first stage 401 receives an initialization vector (IV) instead. The IV typically is part of the shared key information exchanged during the initialization process between the processing module 102 and the memory module 104, as described above. At a given stage, the block cipher logic 404 performs a cipher process (encryption or decryption) using the two inputs, and the result is output to a corresponding input of the XOR logic 406 of the same stage. The XOR logic 406 has a second input to receive a corresponding datum associated with that stage. Each datum may comprise a corresponding cache line from the sequence of memory access operations to the memory module 104. Each datum instead may comprise a corresponding memory address from the sequence of memory access operations to the memory module 104. In the CFB mode illustrated by FIG. 4, all but two XOR operations (one at each memory interface) are removed from the memory access critical path, thus minimizing impact on memory latency while employing the enhanced security afforded by a cipher block chaining technique.

Figure 5:
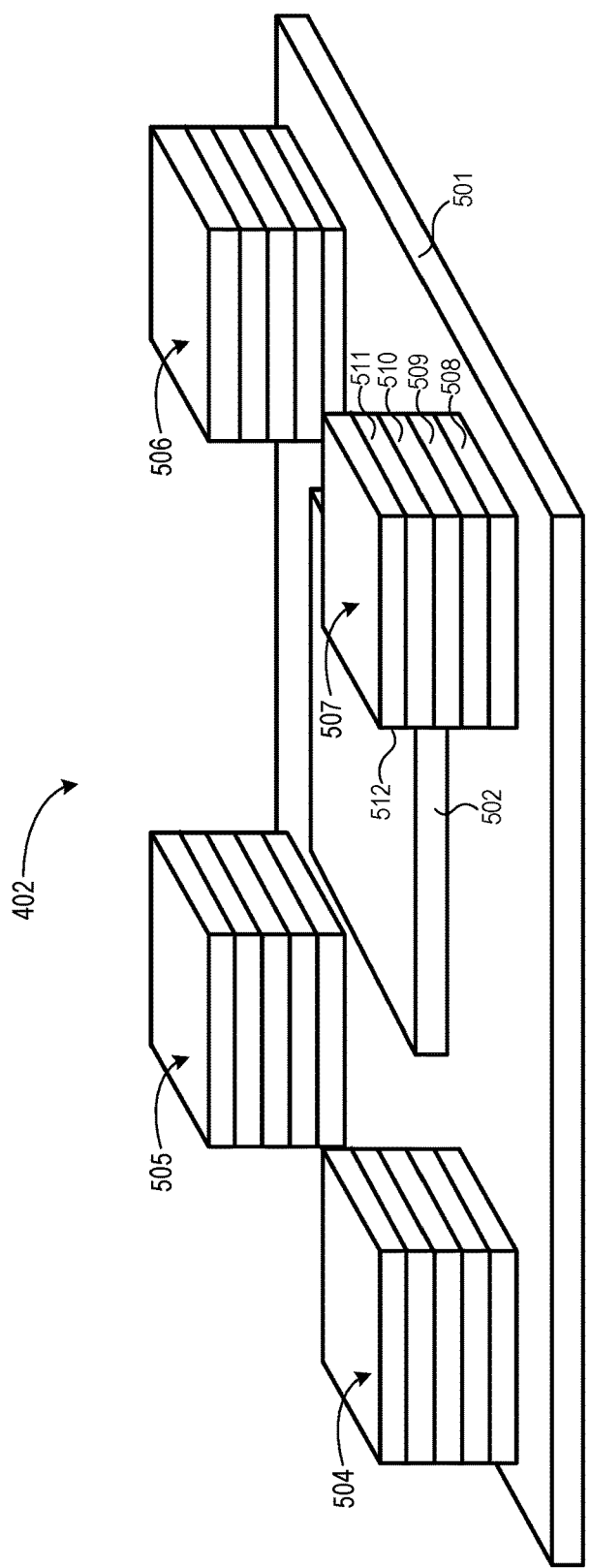
FIG. 5 is a diagram illustrating an example stacked processor-in-memory (PIM) implementation of the processing system of FIG. 1 in accordance with some embodiments.

As explained above, the memory module 104 implements a memory interface 128 with a cryptologic engine 132. This arrangement is particularly well suited for processing-in-memory (PIM) implementations, which utilize additional logic tightly coupled to the corresponding memory circuitry. FIG. 5 illustrates an example PIM-based system 500 that may advantageously utilize the techniques described herein.

In the depicted example, the system 500 includes a host processor 502 (one embodiment of the processing module 102) and a set of one or more memory stacks (one embodiment of the memory modules 104), such as the memory stacks 504, 505, 506, 507, disposed on an interposer 501 (which may comprise a circuit board or die). Each memory stack includes a stack of die, including a logic die 508 and a set of memory dies 509, 510, 511, 512. The logic die 508 implements the memory interface 128 and the memory dies implement the memory core 126. The die of the memory stack are coupled by through-silicon vias (TSVs) (not shown) and thus are relatively difficult to physically tap. The conductive traces (not shown) of the interposer 501 that connects the host processor 502 to the memory stacks 504-507 and the pins (not shown) connecting the conductive traces to the corresponding components form the corresponding interconnects 106 (FIG. 1) between host processor 502 and the memory stacks 504-507. However, unlike the TSVs of the memory stacks, the conductive traces and pins are relatively easy to physically tap and thus relatively easy for an unauthorized entity to access in order to attempt to gain access to the data transmitted over these interconnects. Accordingly, the PIM-based system 500 may employ one or more of the double encryption, memory address encryption, cryptologic hash verification, or chain-based encryption techniques described above to ensure the integrity of the interconnect and the data transported therein.

In some embodiments, the apparatus and techniques described above are implemented in a system comprising one or more integrated circuit (IC) devices (also referred to as integrated circuit packages or microchips), such as the modules 102, 104 described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In an electronic device comprising a processing module coupled to a memory module via a dedicated interconnect, a method comprising:
  in response to initiation of a store operation:
    encrypting, at a first interface to the interconnect at the processing module, a representation of store data of the store operation using a first key and a first feedback-based cryptologic process to generate a first encrypted data;
    encrypting, at the first interface, a memory address of the store operation using the first key and the first feedback-based cryptologic process to generate an encrypted memory address, the memory address corresponding to a memory location of the memory module, the memory module comprising a plurality of memory locations; and transmitting the first encrypted data and the encrypted memory address to the memory module via the interconnect.

2. The method of claim 1, further comprising:

decrypting, at a second interface to the interconnect at the memory module, the first encrypted data using a second key and a second feedback-based cryptologic process to obtain a copy of the representation of the store data;

decrypting, at the second interface, the encrypted memory address using the second key and the second feedback-based cryptologic process to obtain a copy of the memory address; and storing the copy of the representation of the store data to a memory location based on the copy of the memory address.

3. The method of claim 2, further comprising:

selecting, at the first interface, the first key from a plurality of keys based on an attribute of the store operation; and communicating a representation of the attribute from the first interface to the second interface via the interconnect; and selecting, at the second interface, the second key from a plurality of keys based on the representation of the attribute.

4. The method of claim 3, wherein the attribute comprises at least one of: an identifier of a processor core that issued the store operation; an identifier of a process that issued the store operation; an identifier of a thread that issued the store operation; and an identifier of an address space associated with the store operation.

5. The method of claim 2, wherein the first key and the second key are the same key.

6. The method of claim 2, further comprising:

performing, at the first interface, a cryptologic hash using the memory address and the representation of the store data to generate a first hash value;

encrypting, at the first interface, the first hash value to generate an encrypted hash value;

transmitting the encrypted hash value from the first interface to the second interface via the interconnect;

decrypting, at the second interface, the encrypted hash value to generate a copy of the first hash value;

performing, at the second interface, a cryptologic hash using the copy of the memory address and the copy of the representation of the store data to generate a second hash value; and wherein storing the copy of the representation of the store data to the memory location based on the copy of the memory address comprises storing the copy of the representation of the store data to the memory location responsive to a result of a comparison of the second hash value to the copy of the first hash value.

7. The method of claim 2, further comprising:

determining, at the first interface, a next serial number in a sequence of serial numbers;

encrypting, at the first interface, the next serial number to generate an encrypted serial number;

transmitting the encrypted serial number from the first interface to the second interface via the interconnect;

decrypting, at the second interface, the encrypted serial number to generate a copy of the next serial number; and wherein storing the copy of the representation of the store data to the memory location based on the copy of the memory address comprises storing the copy of the representation of the store data to the memory location responsive to a result of a comparison of the copy of the next serial number with an expected next serial number.

8. The method of claim 1, wherein the first feedback-based cryptologic process comprises at least one of a block-chaining cryptologic process and a stream cipher cryptologic process.

9. The method of claim 1, further comprising:

encrypting, at the processing module, the store data using a second key to generate a second encrypted data, wherein the representation of the store data comprises the second encrypted data.

10. The method of claim 1, further comprising:

performing, at the first interface, a cryptologic hash using the memory address and the first encrypted data to generate a first hash value; and transmitting the first hash value from the first interface to the memory module via the interconnect.

11. In an electronic device comprising a processing module coupled to a memory module via a dedicated interconnect, a method comprising:

in response to initiation of a load operation:

encrypting, at a first interface to the interconnect at the processing module, a memory address associated with the load operation using a first key and a first feedback-based cryptologic process to generate an encrypted memory address, the memory address corresponding to a memory location of the memory module, the memory module comprising a plurality of memory locations;

transmitting the encrypted memory address to the memory module via the interconnect;

decrypting, at a second interface to the interconnect at the memory module, the encrypted memory address using a second key to obtain a copy of the memory address;

accessing, at the second interface, a first encrypted data from a memory location of the memory module based on the copy of the memory address;

encrypting, at the second interface, the first encrypted data using a third key and a second feedback-based cryptologic process to generate a second encrypted data;

transmitting the second encrypted data from the second interface to the first interface via the interconnect; and decrypting, at the first interface, the second encrypted data using a fourth key and a third feedback-based cryptologic process to obtain a copy of the first encrypted data.

12. The method of claim 11, further comprising:

decrypting, at the first interface, the copy of the first encrypted data using a fifth key to obtain a copy of load data for the load operation.

13. The method of claim 12, wherein:

the first key and second key comprise the same key; and the third key and the fourth key comprise the same key.

14. The method of claim 11, wherein:

each of the first, second, and third feedback-based cryptologic processes comprise one of a block-chaining cryptologic process or a stream cipher cryptologic process.

15. A processing system comprising:
a processing module including:
   at least one processor core;
   a first interface coupled to the at least one processor core and coupleable to an interconnect, the first interface comprising:
      a first cryptologic engine to encrypt a representation of store data of a store operation and a memory address associated with the store data using a first key and a first feedback-based cryptologic process to generate first encrypted data and an encrypted memory address, the memory address corresponding to a memory location of a memory module, the memory module comprising a plurality of memory locations; and
   wherein the first interface is to transmit the first encrypted data and the encrypted memory address to the memory module via the interconnect.

16. The processing system of claim 15, further comprising:
   a first cryptologic engine to encrypt the store data using a first key to generate second encrypted data, wherein the representation of the store data comprises the second encrypted data.

17. The processing system of claim 15, further comprising:
   the memory module comprising:
      a memory core; and
      a second interface coupled to the interconnect and the memory core, the second interface comprising a second cryptologic engine to decrypt the first encrypted data and the encrypted memory address using a second key and a second feedback-based cryptologic process to generate a copy of the representation of the store data and a copy of the memory address; and
      wherein the second interface is to store the copy of the representation of the store data to a memory location of the memory core based on the copy of the memory address.

18. The processing system of claim 17, wherein:
each of the first and second feedback-based cryptologic processes comprise one of a block-chaining cryptologic process or a stream cipher cryptologic process.

19. The processing system of claim 17, wherein:
the processing module further comprises a first key store to select the first key from a plurality of keys based on an attribute of the store operation; and
the memory module further comprises a second key store to select the second key from a plurality of keys based on a representation of the attribute received via the interconnect.

20. The processing system of claim 17, wherein:
the first interface comprises a first cryptologic hash module to perform a cryptologic hash using the memory address and the representation of the store data to generate a first hash value, and the first interface is to transmit a representation of the first hash value to the memory module; and
the second interface comprises:
   a second cryptologic hash module to perform a cryptologic hash using the copy of the memory address and the copy of the representation of the store data to generate a second hash value; and
   hash compare logic to authorize storage of the copy of the first encrypted data to the memory location responsive to a result of a comparison of the second hash value to the first hash value.

* * * * *